United States Patent
Borowy et al.

(10) Patent No.: US 6,365,868 B1
(45) Date of Patent: Apr. 2, 2002

(54) DSP BASED PLASMA CUTTING SYSTEM

(75) Inventors: Dennis M. Borowy, Hanover; Tianting Ren, Lebanon, both of NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 09/515,139

(22) Filed: Feb. 29, 2000

(51) Int. Cl.$^7$ .............................................. B23K 10/00
(52) U.S. Cl. ........................... 219/121.54; 219/121.57; 219/130.1
(58) Field of Search ................. 219/121.39, 121.49, 219/121.44, 121.54, 121.57, 130.1

(56) References Cited

U.S. PATENT DOCUMENTS

| | | | |
|---|---|---|---|
| 3,646,423 A | 2/1972 | Tatematsu et al. ............. | 321/14 |
| 4,533,986 A | 8/1985 | Jones ........................... | 363/17 |
| 4,562,357 A | 12/1985 | Miyazawa ..................... | 307/66 |
| 4,823,247 A | 4/1989 | Tamoto ........................ | 363/16 |
| 4,939,633 A | 7/1990 | Rhodes et al. ................ | 363/98 |
| 5,079,410 A | 1/1992 | Payne et al. ................. | 219/506 |
| 5,086,205 A | 2/1992 | Thommes ............... | 219/121.54 |
| 5,111,373 A | 5/1992 | Higaki ......................... | 363/37 |
| 5,126,585 A | 6/1992 | Boys ........................... | 307/66 |
| 5,347,164 A | 9/1994 | Yeh .............................. | 307/66 |
| 5,363,020 A | 11/1994 | Chen et al. ............. | 315/209 R |
| 5,367,448 A | 11/1994 | Carroll ........................ | 363/89 |
| 5,394,064 A | 2/1995 | Ranganath et al. ......... | 315/209 |
| 5,465,011 A | 11/1995 | Miller et al. .................. | 307/64 |
| 5,475,580 A | 12/1995 | Noro ........................... | 363/24 |
| 5,519,306 A | 5/1996 | Itoh et al. ................... | 323/222 |
| 5,601,741 A | 2/1997 | Thommes .............. | 219/130.21 |
| 5,864,110 A * | 1/1999 | Moriguchi et al. .... | 219/121.57 |
| 6,002,103 A | 12/1999 | Thommes .............. | 219/130.21 |
| 6,177,645 B1 * | 1/2001 | Church et al. ......... | 219/121.39 |
| 6,236,014 B1 | 5/2001 | Ulrich ................... | 219/121.57 |
| 6,239,407 B1 | 5/2001 | Thommes .............. | 219/130.21 |

FOREIGN PATENT DOCUMENTS

| | | |
|---|---|---|
| EP | 0444428 A2 | 9/1991 |
| EP | 0518300 B1 | 9/1996 |
| EP | 0804827 B1 | 10/1998 |
| JP | 05344730 A | 12/1993 |
| WO | 96/22627 | 7/1996 |

OTHER PUBLICATIONS

Dixon, Jr., Lloyd H., "High Power Factor Preregulators for Off–Line Power Supplies", *Unitrode Switching Regulated Power Supply Design Seminar Manual*, 1988, p. 6–1.

"Power Factor Controller", *Linear Technology*, 1993, pp. 1–12.

"Power Factor and PWM Controller", *Linear Technology*, 1995, pp. 1–16.

Hall, George A., "Low Cost Electronic Ballast System Design", *Micro Linear*, Jun. 1996, pp. 1–3.

Markell, Richard, "Service, Customer Satisfaction, and All That", *Linear Technology*, vol. 3, No. 2, Jun. 1993, pp. 1–5, 13.

"Power Factor Correction Using TOPSwitch® Design Note DN–7", *Power Integrations, Inc.*, Dec. 1995, pp. 1–12.

* cited by examiner

*Primary Examiner*—Mark Paschall
(74) *Attorney, Agent, or Firm*—Testa, Hurwitz & Thibeault, LLP

(57) ABSTRACT

This invention relates to methods and apparatus for controlling a power supply of a plasma arc system. According to the method, any AC input voltage within a range of input voltages is provided into the input stage and a rectified output voltage is thereby generated. The rectified output voltage is provided into the power factor corrected boost stage and a DC signal is thereby generated. The DC signal is provided into an auxiliary power supply and a regulated power signal is thereby generated. The regulated power signal is provided into a digital signal processor module and an output control signal is thereby generated. The output control signal is provided into the inverter stage and a plasma arc current is thereby generated.

34 Claims, 10 Drawing Sheets

DSP BASED PLASMA CUTTING SYSTEM

FIELD OF THE INVENTION

The invention relates generally to the field of power supplies. More specifically, the invention relates to a method and apparatus for accepting a wide range of input power and controlling the output power in a plasma arc power supply and control system.

BACKGROUND OF THE INVENTION

Power supplies typically convert a power input to a necessary or desirable power output tailored for a specific application. In plasma arc cutting applications, power sources typically receive a high voltage alternating current (VAC) signal and provide a high current, plasma arc cutting output. Around the world, utility power supplies provide sinusoidal line voltages of 200/208V, 230/240V, 380/415V, 460/480V, 500V and 575V. The signals provided by these supplies can be either single-phase or three-phase and can have frequencies of either 50 or 60 Hz. Power supplies for plasma arc systems receive such inputs and produce a high current DC output of approximately 10–400 amperes for use as plasma arc cutting output.

In plasma arc cutting, high energy power is delivered to a plasma arc torch to produce an arc that generates heat sufficient to cut a metal workpiece. There are many types of power supplies capable of providing power sufficient for generating a plasma arc cutting applications. Some prior art power supplies are resonant converter power sources that deliver a sinusoidal output. Other power supplies provide a squarewave output. Yet another type of power supplies is an inverter-type power source.

Inverter-type power supplies are particularly well suited for plasma arc cutting applications. An inverter power supply can provide an ac square wave or a dc output. Inverter power supplies also provide for a relatively high frequency stage, which provides a fast response in the plasma arc current output to changes in the control signals.

In general, an inverter-type power source receives a sinusoidal line input, rectifies the sinusoidal line input to provide a dc bus, and inverts the dc bus and can rectify the inverted signal to provide a dc output. It is desirable to provide a generally flat and regulated, i.e. very little ripple, dc bus. Accordingly, it is not sufficient to simply rectify the sinusoidal input; rather, it is necessary to also smooth, and in many cases alter the voltage of, the input power. This is called preprocessing of the input power. The ability to automatically adapt to a number of input power voltage magnitudes is advantageous since different voltages can be used in plasma arc cutting.

To create the adaptability, the power supply requires several stages that require different size magnetics and different switching frequencies. To control the heat dissipation and the size of the magnetics, there is a need to control the adaptable power supply in an integrated fashion. With the several frequencies of the power supply, there is a need to integrate control of the power supply to increase allowable alternate design strategies. This invention addresses these needs.

SUMMARY OF THE INVENTION

This invention relates to methods and apparatus for controlling a power supply of a plasma arc system. In one embodiment, the power supply includes an input stage, a power factor corrected boost stage and an inverter stage. In one aspect, the invention relates to a method of controlling a power supply of a plasma arc system. According to the method, any AC input voltage within a range of input voltages is provided into the input stage and a rectified output voltage is thereby generated. The rectified output voltage is provided into the power factor corrected boost stage and a DC signal is thereby generated. The DC signal is provided into an auxiliary power supply and a regulated power signal is thereby generated. The regulated power signal is provided into a digital signal processor module and an output control signal is thereby generated. The output control signal is provided into the inverter stage and a plasma arc current is thereby generated.

In one embodiment, the method includes the step of generating the output control signal based on an average duty cycle of the inverter stage. In another embodiment, the method includes the step of providing into the digital signal processor module at least one of a start signal generated in response to a user input and a current command signal generated in response to a user input and a current feedback signal generated in response to current flow through a plasma torch electrode. The method can include the step of providing the output control signal to the inverter stage based on the regulated power signal and at leas one of the start signal, the current command signal and the current feedback signal.

In another embodiment, the method includes the step of providing into the digital signal processor module a rectified voltage signal generated in response to the rectified output voltage of the input stage. The method can include the step of limiting the plasma current or voltage based on the rectified voltage signal. In another embodiment, the method includes the steps of providing into the digital signal processor module a transfer signal generated in response to current flow through a work piece and providing from the digital signal processor module to a nozzle in a plasma torch electrode a pilot arc control signal. The method can include the step of providing the output control signal to the inverter stage based on the transfer signal. The method can include the step of inhibiting current flow through the nozzle in the plasma torch electrode in response to the pilot arc control signal. The method can include the step of providing a relay control signal from the digital signal processor module to a relay that opens or closes a substantially short circuit in parallel with an inrush current limiting resistor provided in the power supply. The method can include the step of providing the relay control signal based on at least one of the regulated power signal and the rectified voltage signal.

In another embodiment, the method includes the step of providing to the power factor corrected boost stage from the digital signal processor module a second output control signal. The second output control signal can be based on the frequency of the switching of the inverter stage. The method can include the step of providing into the digital signal processor module a safety status signal generated in response to the removal of a retaining cap of a plasma torch electrode. The method can include the step of latching the state of the safety status signal when the safety status signal changes from a first value to a second value. The method can include the step of inhibiting the flow of the plasma arc current when the safety status signal is latched in a predetermined state.

In another embodiment, the method includes the step of using a harmonic injection algorithm to improve a power factor of the power supply. The method can include the steps of providing the DC signal to a transformer, providing from the transformer the regulated power control signal and switching the DC signal through the transformer in response to a value of the regulated power signal. The AC input voltage can be a single-phase signal or a multi-phase signal. In another embodiment, the method includes the step of generating a rectified voltage from the output of the inverter stage of the power supply. The output of the inverter stage is capable of producing the plasma arc current. The method can include the step of damping the generated rectified output voltage of the input stage. The method can include the step of filtering the AC input voltage prior to the step of providing the AC input voltage to the input stage.

In another aspect, the invention relates to a system for controlling a power supply of a plasma arc system. The system includes an input stage, a power factor corrected boost stage, an inverter stage, an auxiliary power supply and a digital signal processor module. The input stage includes a circuit for receiving any AC input voltage within a range of input voltages and generating a rectified output voltage. The power factor corrected boost stage is electrically connected to the input stage and includes a circuit for receiving the rectified output voltage and generating a DC signal. The inverter stage is electrically connected to the power factor corrected boost stage and includes a circuit for receiving the DC signal and generating an AC signal capable of providing a current to a plasma torch electrode. The auxiliary power supply is electrically connected to the power factor corrected boost stage and includes a circuit for receiving the DC signal and generating a regulated power signal. The digital signal processor module is in communication with the auxiliary power supply and the inverter stage and includes a circuit for receiving the regulated power signal and providing an output control signal to the inverter stage for generating a plasma arc current.

In one embodiment, the digital signal processor module is in electrical communication with at least one of a first switch and a second switch and a current sensor and the input of the power factor corrected boost stage. The digital signal processor module is configured to provide the output control signal based on the regulated power signal and at least one of the start signal and the current command signal and the current feedback signal and the rectified voltage signal. The first switch provides a start signal in response to a user input. The second switch provides a current command signal in response to a user input. The current sensor provides a current feedback signal in response to current flow through the plasma torch electrode. The input of the power factor corrected boost stage provides a rectified voltage signal in response to the rectified output voltage of the input stage.

In another embodiment, the system further comprises a pilot arc control switch in electrical communication with the digital signal processor module and a nozzle of the plasma torch electrode. The pilot arc control switch includes a circuit for inducing and inhibiting current flow through the nozzle in response to a pilot arc control signal generated by the digital signal processor module. In another embodiment, the system further comprises a relay in electrical communication with the digital signal processor module, the output of the input stage and the input of the power factor corrected boost stage. The relay opens or closes a substantially short circuit in parallel with an inrush current limiting resistor provided in the power supply in response to a relay control signal generated by the digital signal processor module. In another embodiment, the digital signal processor module is in electrical communication with the power factor corrected boost stage and is configured to provide a second output control signal to the power factor corrected boost stage. In another embodiment, the digital signal processor module is configured to provide the second output control signal based on the frequency of the switching of the inverter stage of the power supply. In another embodiment, the digital signal processor module is configured to provide the second output control signal based on a harmonic injection algorithm to modify the power factor of the power supply. In another embodiment the digital signal processor module is in electrical communication with a third switch. The third switch provides a safety status signal in response to the removal of a retaining cap of a plasma torch electrode. In another embodiment, the digital signal processor module further comprises a latching module for latching the state of the safety status signal when the safety status signal changes from a first value to a second value. The flow of the plasma arc current is inhibited when the safety signal is latched in a predetermined state. In another embodiment, the auxiliary power supply includes a flyback topology. In another embodiment, the input stage is configured to receive a single-phase AC input voltage. In another embodiment, the input stage is configured to receive a multi-phase AC input voltage. In another embodiment, the system further comprises a second rectifier stage electrically connected to the inverter stage and a plasma torch electrode. The second rectifier stage includes a circuit for generating a rectified voltage from the output of the inverter stage. In another embodiment, the system further comprises a damping stage electrically connected to the input stage and the power factor corrected boost stage. The damping stage includes a circuit for damping the rectified output voltage of the input stage. In another embodiment, the system further comprises a filtering stage electrically connected to the input stage. The filtering stage includes a circuit for filtering the AC input voltage prior to the input stage receiving the AC input voltage. In another embodiment, the system further comprises an on-board programming module in electrical communication with the digital signal processor module and an external storage device. The on-board programming module includes a circuit for transferring a computer program contained in the storage device to the digital signal processor module.

In another embodiment, the digital signal processor module further comprises an input conditioning module, an output conditioning module and a DSP device. The input conditioning circuit is configured to receive an input signal from source external to the digital signal processor module and to condition the input signal to a level acceptable to a digital signal processor. The output conditioning circuit is configured to receive an output signal from the digital signal processor and to condition the output signal to a level acceptable to a circuit external to the digital signal processor module receiving the conditioned output signal. The digital signal processor device is in electrical communication with the first conditioning circuit and the second conditioning circuit and is configured to receive the input signal and generate the output signal. In another embodiment, the digital signal processor device is configured to receive a computer program from an external device. In another embodiment, the digital signal processor device is configured to perform a self-health operation and to reset if the self-health operation is not executed properly. In another embodiment the second conditioning circuit is configured to receive the first output control signal which comprises a positive switch command signal and a negative switch command signal and to condition the output control signal to a level acceptable to the inverter stage. In another embodiment, the digital signal processor device is configured to generate the positive switch command signal and the negative switch command signal as a matched set with the same value at the same time frame of the signal generation.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which.

DETAILED DESCRIPTION

Figure 1A:
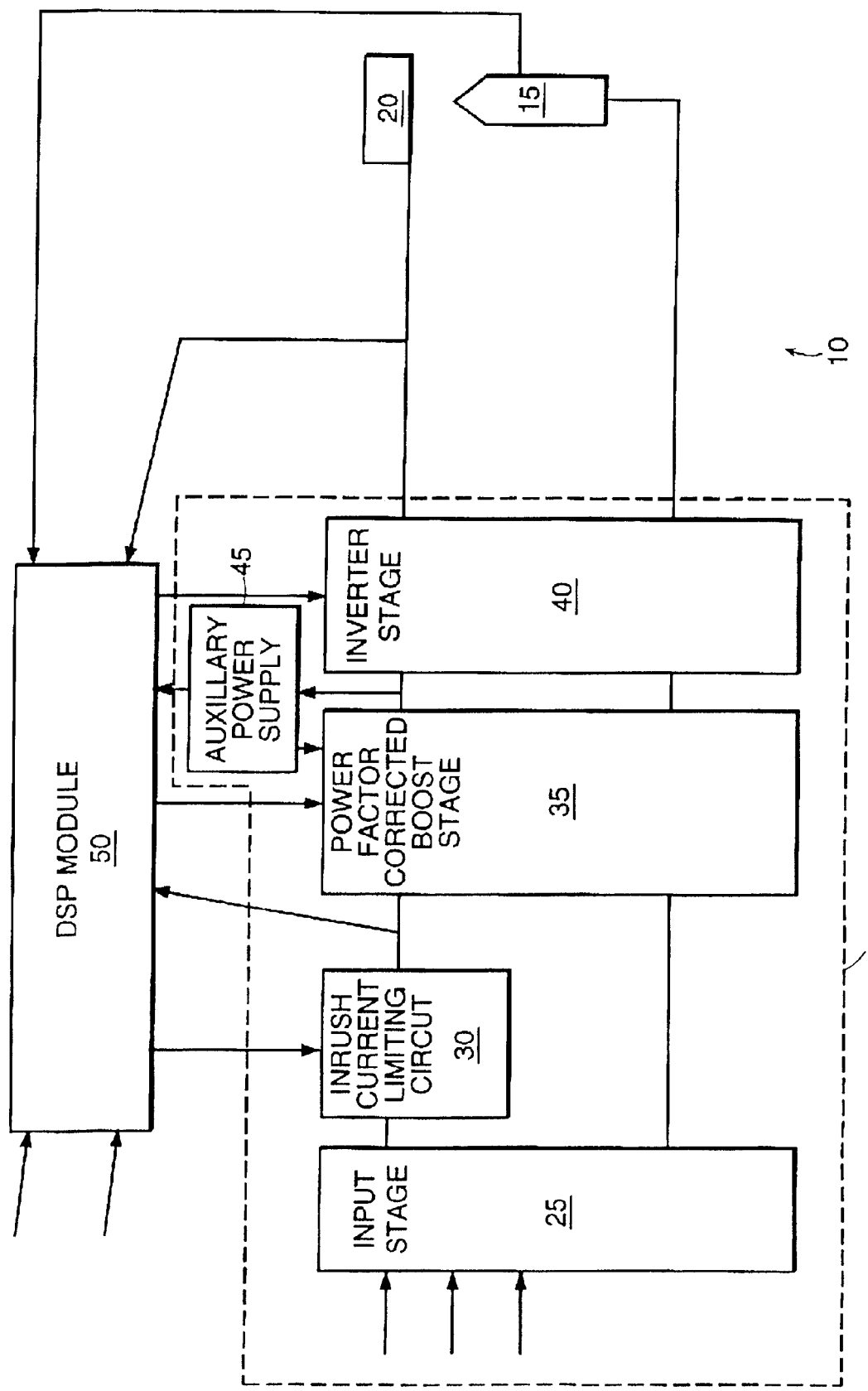
FIGS. 1a and 1b are block diagrams of a plasma arc power supply and control system according to the invention.

Referring to FIG. 1a, a plasma arc power supply and control system 10 includes a digital signal processor ("DSP") module 50 and a power supply 5. The DSP module 50 is in electrical communication with the power supply 5 and an electrode 15 of a plasma torch. The DSP module 50 is configured to receive inputs generated throughout the plasma arc power supply and control system 10 and determine outputs based on those inputs. The outputs control the power supply 5.

The power supply 5 includes an input stage 25, an inrush current limiting circuit 30, a power factor corrected boost stage 35, an inverter stage 40 and an auxiliary power supply 45. The input stage 25 receives an AC power signal from an external power source (not shown) and rectifies that AC power signal. The rectified AC signal is provided, through the inrush current limiting circuit 30, to the power factor corrected boost stage 35. The boost stage 35 converts the rectified AC power signal, which can vary based on the magnitude of the external power supply, to a constant, predefined DC voltage signal. The DSP module 50 can control the power factor corrected boost stage 35. The predefined DC voltage signal is provided to the inverter stage 40 and the auxiliary power supply 45. The auxiliary power supply 45 provides a regulated power signal to the DSP module 50. The auxiliary power supply 45 can provide a regulated power signal to the DSP module 50. The inverter stage 40 inverts the predefined DC voltage signal to an AC signal, which is provided to the electrode 15.

Figure 1B:
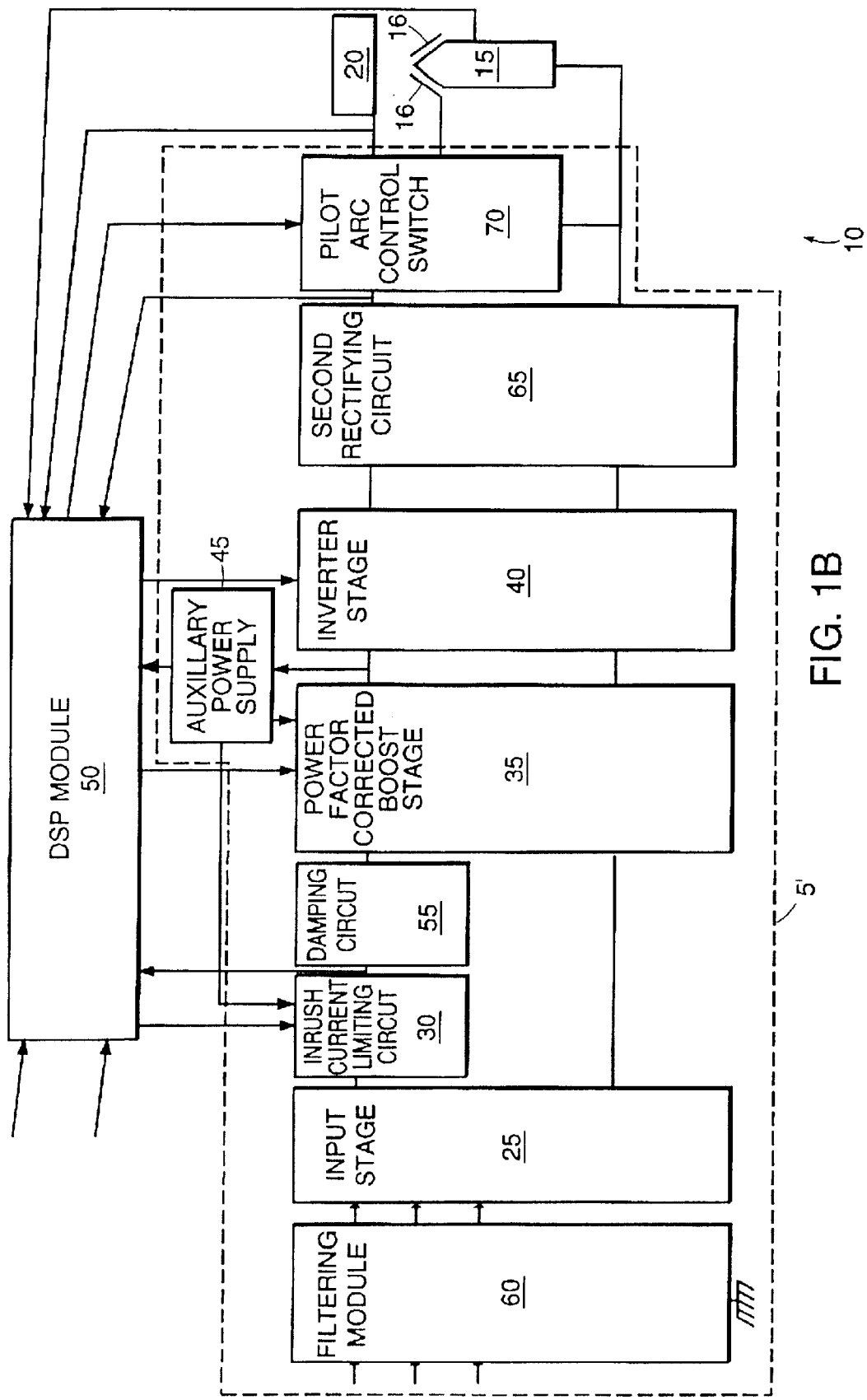

In other embodiments, the power supply 5' can include a damping circuit 55 and/or a filtering module 60 in front of the input stage 25 and/or a second rectifying circuit 65 and/or a pilot arc control switch 70 as shown in FIG. 1b. The filtering module 60 is electrically connected to the external power source (not shown) and the input stage 25. The filtering module 60 filters the AC power signal from the external power supply. The damping circuit 55 is electrically connected to the inrush current limiting circuit 30 and the power factor corrected boost stage 35. The second rectifying circuit 65 is electrically connected to the inverter stage 45 and the pilot arc control switch 70. The pilot arc control switch 70 is in electrically connected to the second rectifying circuit 65 and the electrode 15.

Figure 2:
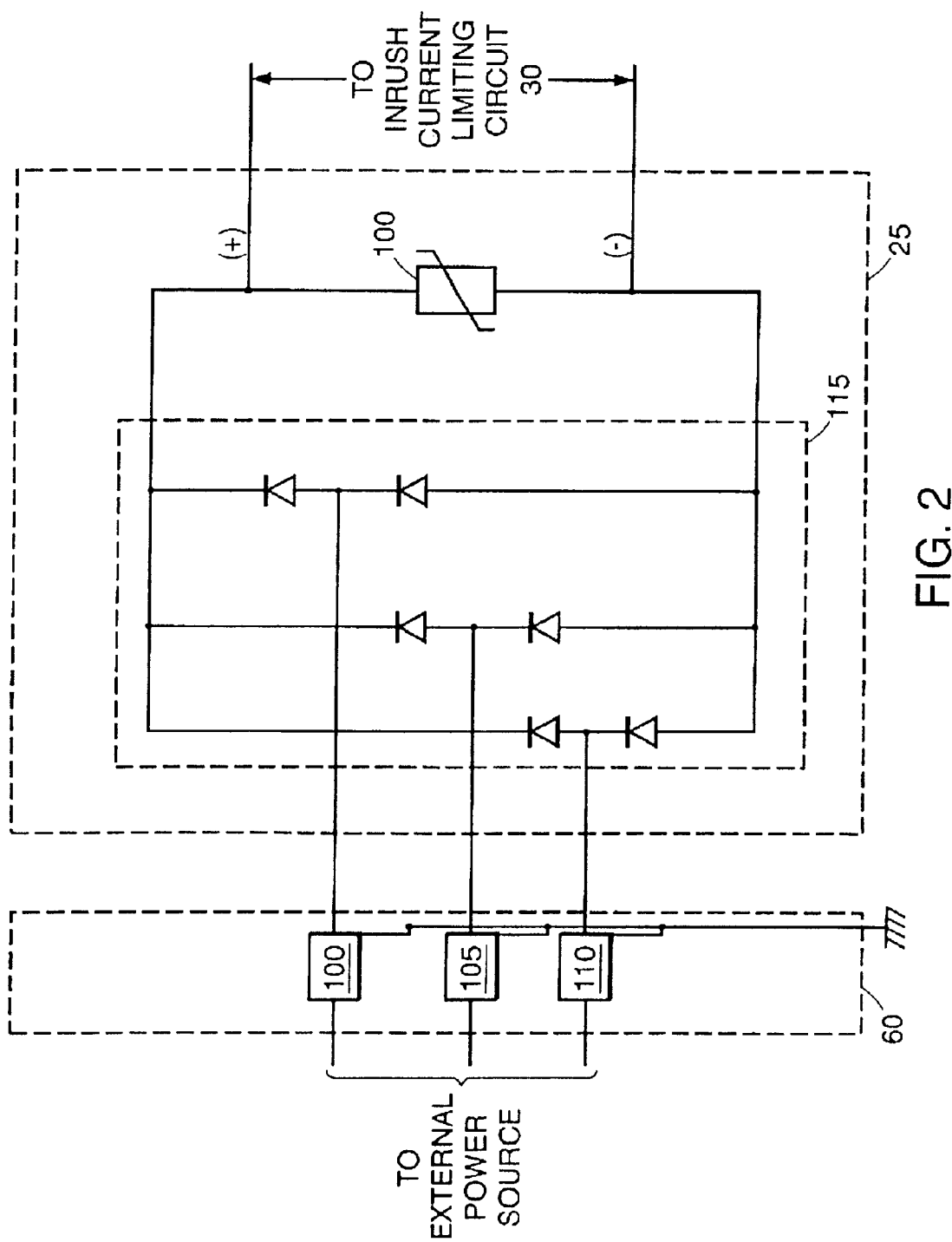
FIG. 2 is a circuit diagram of an embodiment of an input stage of a plasma arc power supply and control system according to the invention.

The filtering module 60 and the input stage 25 are provided in detail in FIG. 2. The filtering module 60 is provided between the external power source (not shown) and the input stage 25. The filtering module 60 includes EMI filters 100, 105, 110. The EMI filters 100, 105, 110, for example, can be made up of inductors and capacitors. EMI filter design is well known by those skilled in the art. The EMI filters 100, 105, 110 prevent emission of switching noises from the plasma arc power supply and control system 10 to the external power source or other devices on that same bus. The EMI filters can also help prevent noise generated from the external power supply from entering the input stage 25.

In the embodiment shown in FIG. 2, the input stage 25 is configured to receive three inputs from an external power source. The input stage 25, however, can handle both a single-phase alternating current ("AC") power signal and a multi-phase AC power signal. The AC power signal is rectified using a diode bridge 115. The diode bridge 115 can be implemented with discrete diodes or can be purchased as a single component (e.g., P/N SKD160/18, manufactured by Semikron). The output of the diode bridge 115 is a rectified AC voltage ("$V_{ACR}$"), which is a generally an unidirectional, direct current ("DC") signal. The output of the input stage 25 is provided to the inrush current limiting circuit 30. A line suppression device 120 is used to suppress line spikes. The line suppression device 120, for example, can be a varistor.

Figure 3:
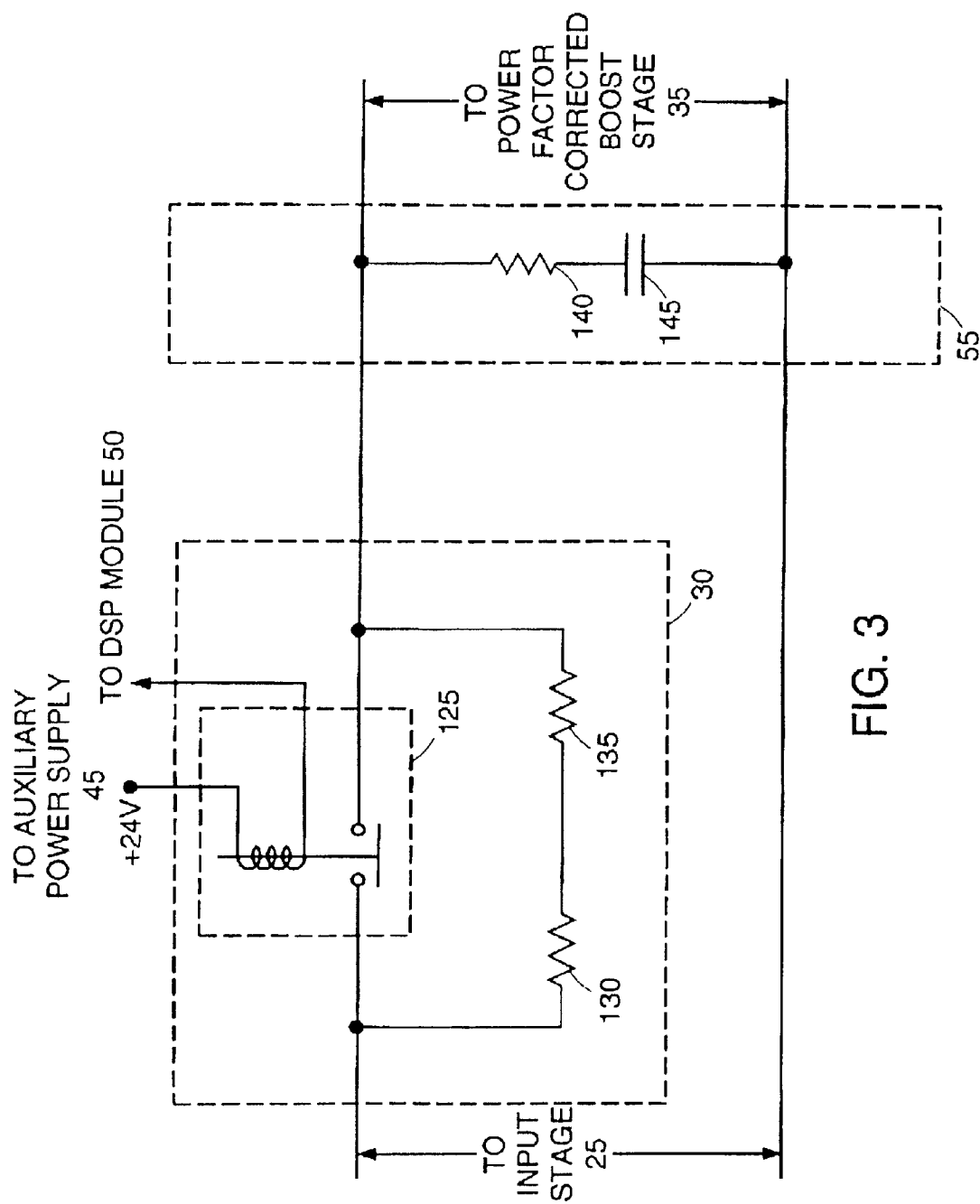
FIG. 3 is a circuit diagram of an embodiment of an inrush current limiting circuit and a damping circuit of a plasma arc power supply and control system according to the invention.

FIG. 3 shows details of the inrush current limiting circuit 30 and the damping circuit 55. The inrush current limiting circuit includes a relay 125 and two current limiting resistors 130, 135. The current limiting resistors 130, 135 typically have low resistance (e.g., 5 ohms). Two resistors 130,135 are used so that the power rating for each resistor can be lower. Upon power up, (i.e., the time when power is initially applied to the input stage 25 and current flows to the inrush current limiting circuit), the relay 125 is initially open. The relay 125 directs all current flow through the current limiting resistors 130, 135. This prevents a surge of current (i.e., inrush current) which would occur due to the bulk capacitance at the input of the inverter stage 40. Once the DSP module 50 detects the completion of precharging the capacitance, the DSP module 50 sends a signal to the relay 125. This signal (e.g., a ground for the +24V) causes current flow through the relay coil, which causes the relay 125 to close its contacts. The current is now shorted through the closed contacts instead of through the current limiting resistors 130, 135. This is the normal state of operation after initial power-up. The output of the inrush current limiting circuit 30 is sent to a damping circuit 55.

The damping circuit 55 is provided between the inrush current limiting circuit 30 and the power factor corrected boost stage 35. The damping circuit 55 includes a resistor 140 and a capacitor 145. The resistor, for example, can have a value of resistance of about 3 ohms. The capacitor 145, for example, can have capacitance of about 10 microfarads. The damping circuit 55 dampens any resonance between the capacitance of the decoupling capacitor 150, shown in FIG. 4, and the inductance of the input power line. The output of the damping circuit 55 is sent to the power factor corrected boost stage 35.

Figure 4A:
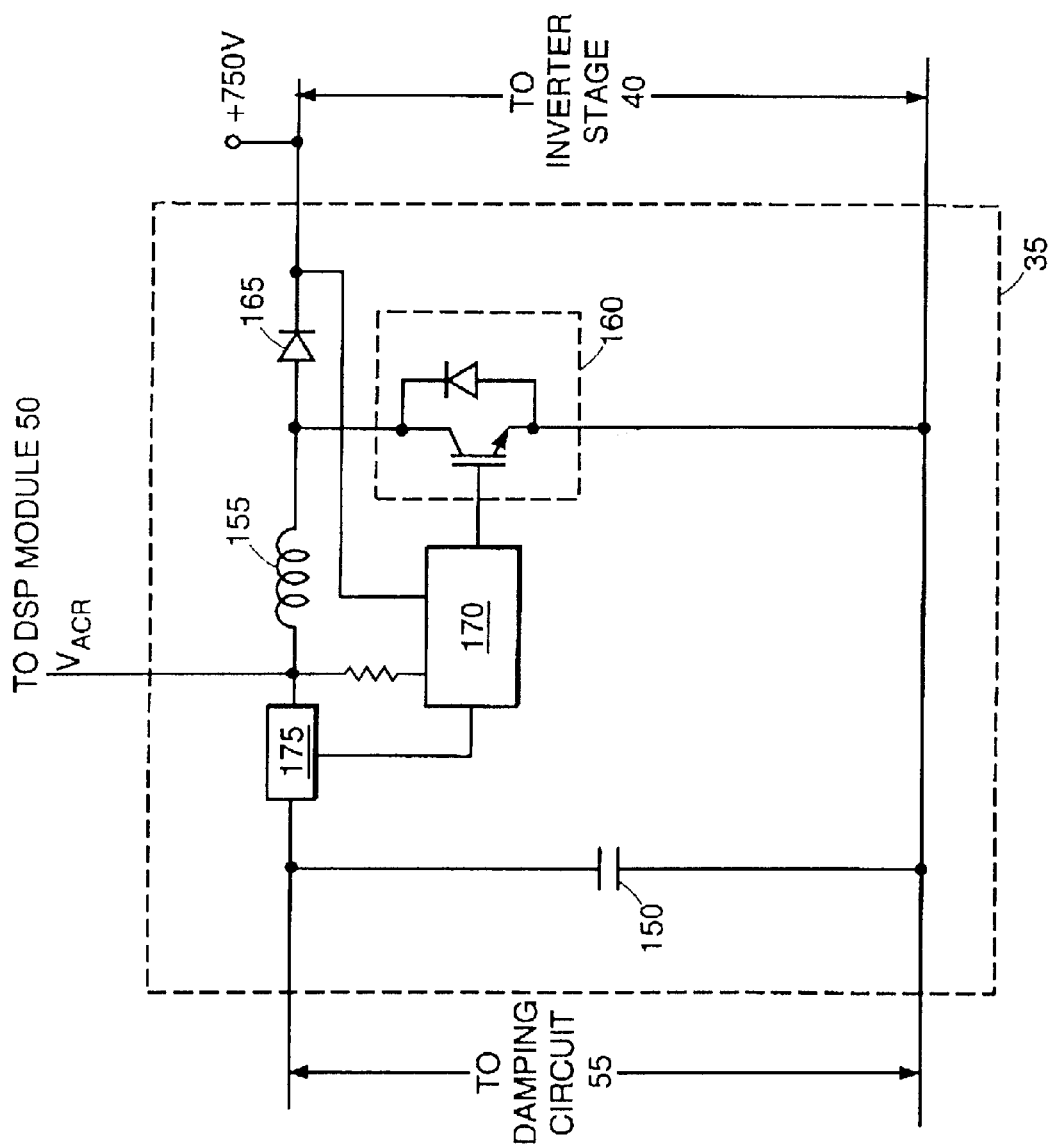
FIGS. 4a and 4b are circuit diagrams of a power factor corrected boost supply for a plasma arc power supply and control system according to the invention.
Figure 4B:
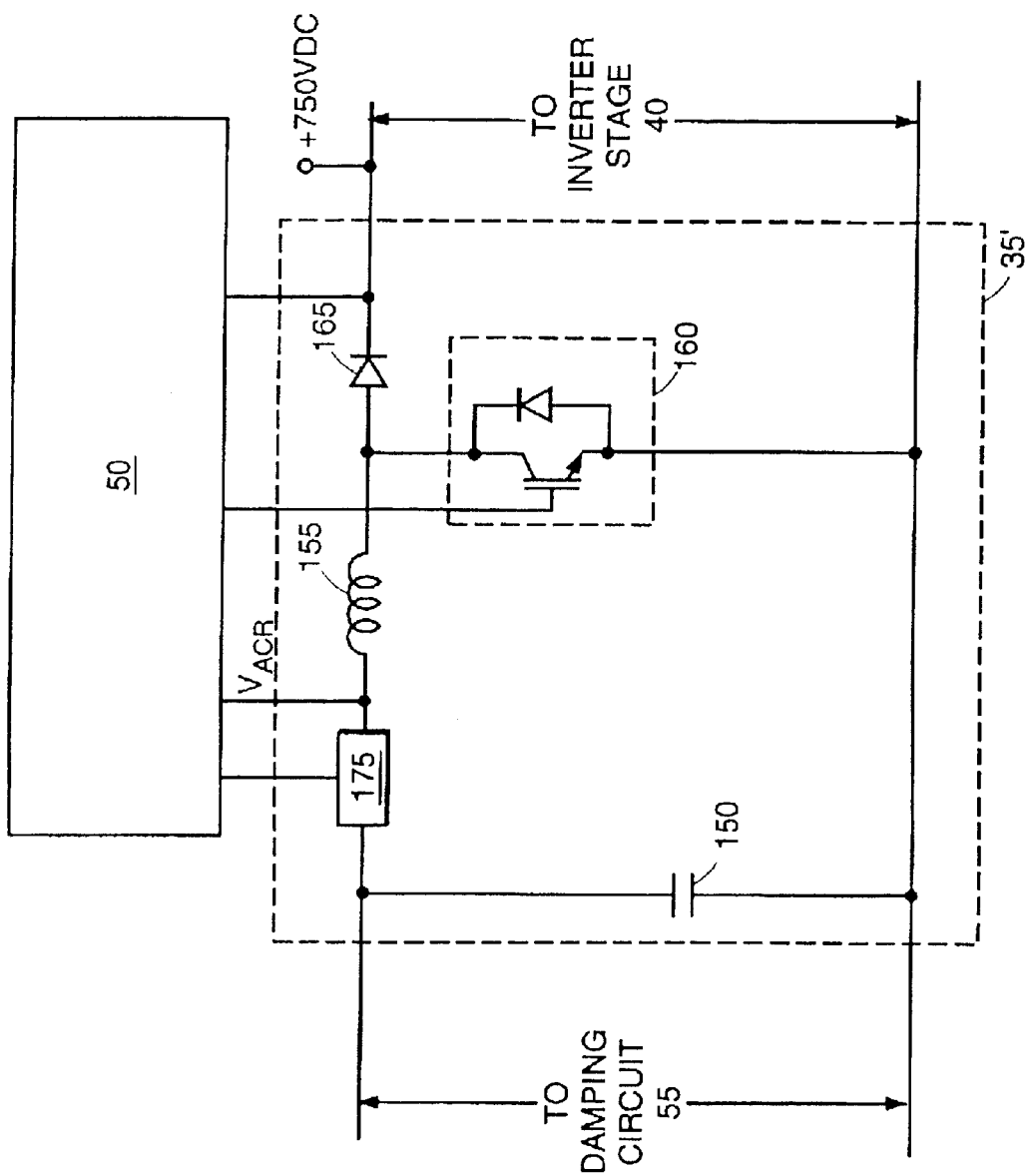

FIGS. 4a and 4b provide details of two embodiments of the power factor corrected boost stage 35, 35'. The power factor corrected boost stages 35, 35' of both embodiments include a decoupling capacitor 150, an inductor 155, a switch 160 and a diode 165. The decoupling capacitor 150, for example, can have a capacitance of about 20 microfarads. The inductor 155, for example, can have an inductance of about 0.5 millihenries. The switch 160, for example, can be an IGBT switch. A rectified voltage signal (labeled $V_{ACR}$ in FIGS. 4a and 4b) is transmitted to the DSP module 50.

In general, the power factor corrected boost stage 35, 35' provides an output voltage that is equal to the input voltage divided by one minus the duty cycle of the switch 160 (e.g., Vout=Vin/(1-duty)). Thus, if the switch 160 is off 100% of the time, the output voltage to the inverter stage 40 is equal to the input voltage (from capacitor 150 and input stage 25). In one embodiment the lowest input is about 200 volts, and the desired output to the inverter stage 40 is about 750 volts, thus the upper limit for the "boost" is about 375%, and requires a duty cycle of about 73%.

The operation of a boost circuit is well known in the art and will be briefly described herein. When the switch 160 is turned on, current flows through the inductor 155 to the negative voltage bus, thus storing energy in inductor 155. When the switch 160 is subsequently turned off, the energy is transferred from inductor 155 through a diode 165 to the inverter stage 40 capacitors 185', 185". The amount of energy transferred is controlled by controlling the duty cycle in accordance with the formula stated above.

The control of the switch 160 is different in FIGS. 4a and 4b. FIG. 4a shows a switch controller 170 (e.g., P/N UC3854BN, manufactured by Unitrode) controlling the operation of the switch 160. The switch controller 170 inputs include a current sensor 175 (e.g., P/N LA200P/SPI, manufactured by LEM) and two voltage inputs $V_{ACR}$ and $V_{+750}$. The switch controller contains an algorithm to adjust the duty cycle to perform the power factor correction. Not shown are other inputs into the switch controller 170 that monitor for over-current or over-voltage or any other unsafe operating conditions and cause the switch controller 170 to react accordingly. Such circuitry is well known in the art.

FIG. 4b shows the DSP module 50 controlling the switch 160. The DSP module receives the same inputs as the switch controller 170, the current sensor 175 (e.g., P/N LA200P/SPI, manufactured by LEM) and two voltage inputs $V_{ACR}$ and $V_{+750}$. However, controlling with the DSP module 50 provides an additional benefit. The DSP module 50 knows the state of the other components in the plasma arc power supply and control system 10 and can use these states to control the power factor corrected boost stage 35. By controlling based on all of the plasma arc power supply and control system 10, the DSP module 50 improves the overall performance of the entire plasma arc power supply and control system 10. For example, the DSP module 50 knows the switching frequencies of the power factor corrected boost stage 35 and the inverter stage 40 and can keep them at the same frequency. Not shown are other inputs into the DSP module 50 that monitor for over-current or over-voltage or any other unsafe operating conditions and cause the DSP module 50 to react accordingly. Such circuitry is well known in the art and is implemented as needed. The DSP module 50, its control methods, and its advantages are described in more detail below. The output of the power factor corrected boost stage 35 is sent to the inverter stage 40.

Figure 5:
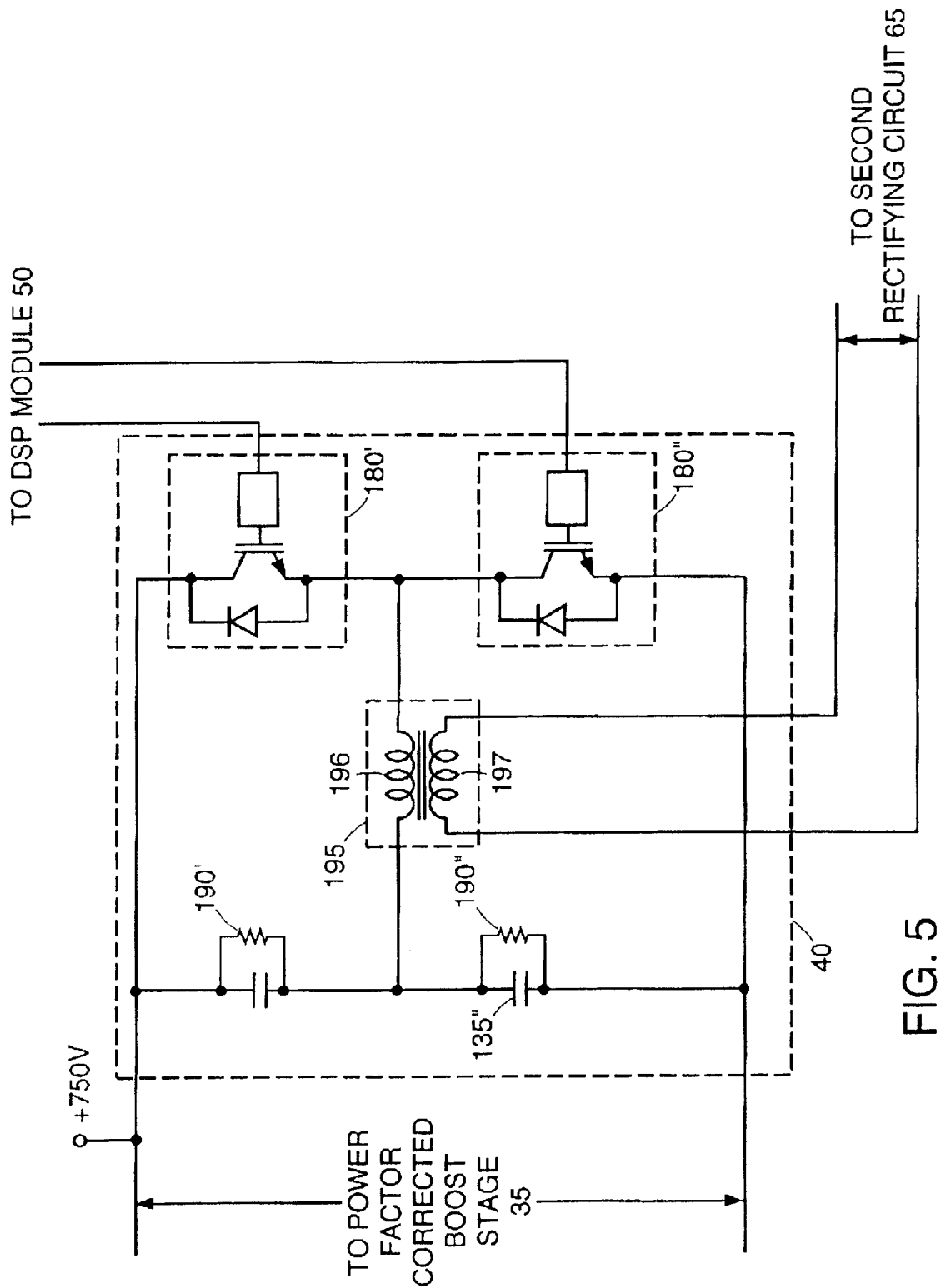
FIG. 5 is a circuit diagram of an embodiment of an inverter stage of a plasma arc power supply and control system according to the invention.

FIG. 5 provides details of the inverter stage 40. The inverter stage 40 includes two switches 180', 180", two filter capacitors 185', 185", two voltage divider resistors 190', 190" and a transformer 195. The switches 180', 180", for example, can be optically coupled IGBTs (e.g., P/N ZMBI150PC-140, manufactured by Fuji). The capacitors 185', 185", for example, can have capacitance of about 3,300 microfarads. The resistors, for example, can have resistance of about 24,000 ohms. Optically coupled IGBTs switches provide fast switching action for high frequency operation. The inverter stage 40 can be controlled with pulse width modulation ("PWM") and can provide a quasi-square wave output having a peak-to-peak magnitude equal to the magnitude of the input. In one embodiment, with a 750 volt input voltage from the output of the power factor corrected boost stage 35, the output to the transformer 195 (e.g., with a 1 to 0.8 ratio) can be approximately +300 volts to −300 volts centered about zero. The DSP module 50 controls the switching of the two switches 180', 180". The control methods and advantages of the DSP module 50 are described in more detail below. The voltage divider resistors 190', 190" are equal and ensure the voltage of the output of the power factor corrected boost circuit 35 is divided in half. The filter capacitors 185 help filter out switching noises and keep the ripple voltage to a minimum. The switches 180 drive a primary winding 196 of the transformer 195 with a high voltage (typically +375 to −375 volts), signal. The transformer 195 transforms the signal and generates an output on a secondary winding 197 a lower voltage, high current signal suitable for cutting. The output of the inverter stage 40 is typically sent to a second rectifying circuit 65.

Figure 6:
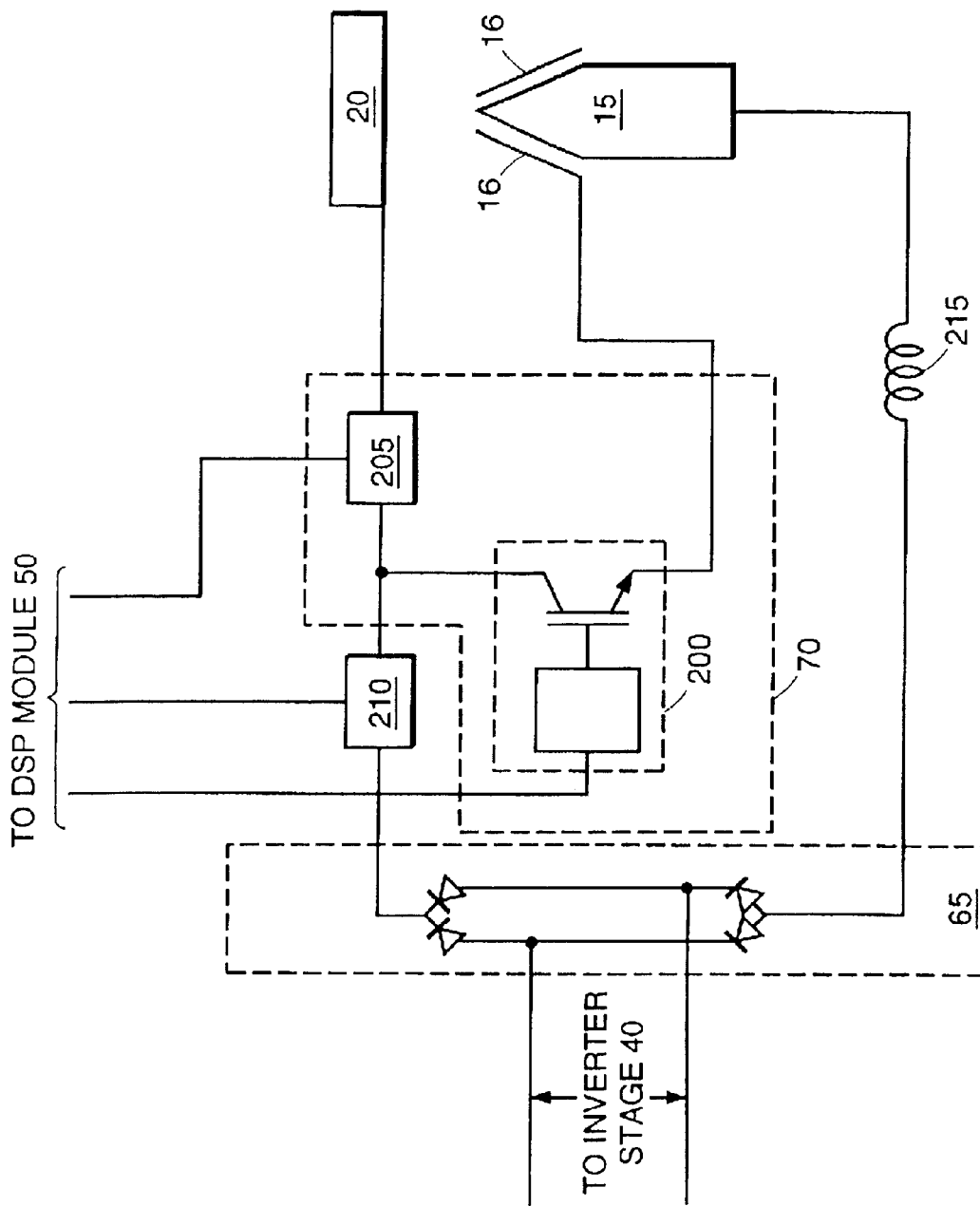
FIG. 6 is a circuit diagram of an embodiment of a second rectifying circuit and a pilot arc control switch of a plasma arc power supply and control system according to the invention.

Referring to FIG. 6, the second rectifying circuit 65 is similar in embodiment and function to the input stage 25 shown in FIG. 2. The second rectifying circuit 65 can be a standard four diode bridge for changing an AC input to a uni-directional current flow, a generally DC signal. Where the input stage 25 is configured to receive a single- or multi-phase input AC signal, the second rectifying circuit 65 is configured to receive the single-phase output of the inverter stage 40. An output inductor 215 is used to smooth the output. Methods for rectifying an AC signal with a diode bridge are well known to those skilled in the art.

The generally DC signal of the second rectifying circuit 65 is used to create the current for the arc for the cutting application. A current sensor 210 monitors the current flow for the arc. The current sensor 210 outputs a voltage that represents the current flow through the current sensor 210. This voltage can be referred to as the current feedback signal. The current feedback signal is transmitted to the analog to digital converter ("A/D") of the DSP device 280, shown in FIG. 8. The analog to digital converter ("A/D") of the DSP device 280 converts the voltage to counts and these counts are used by the DSP device 280 to calculate certain outputs. For example, the current sensor 210 can be P/N LAH100P, manufactured by LEM. If P/N LAH100P is used, the output voltage is about 44.36 millivolts per ampere of current.

The pilot arc control switch 70 directs the current flow for the arc either to the nozzle 16 of the plasma torch or the workpiece 20. The pilot arc control switch includes a switch 200 and a current sensor 205. The switch 200, for example, can be an optically coupled IGBT (e.g., P/N SKM75GAL123D, manufactured by Semikron). The current sensor 205, for example, can be P/N LAH100P, manufactured by LEM. The DSP module 50 controls the switch 200 via a pilot arc control signal. The control methods and advantages of the DSP module 50 are described in more detail below.

Generally, the switch 200 is initially closed, directing current flow through the nozzle 16 of the plasma torch. As the user brings the plasma torch within close distance to the workpiece 20, some current will flow from the electrode 15 to the workpiece 20. This current flow is sensed by the current sensor 205 and sent to the DSP module 50. The DSP module 50 transmits a command, the pilot arc control signal, to the switch 200 that causes the switch 200 to open. All of the current is then directed from the electrode 15 to the workpiece 20.

As the DSP module 50 commands the switch 200 to open, the DSP module 50 also controls the commands to the inverter stage switches 180', 180" to ensure that there is appropriate current flow to the workpiece 20 to perform the desired operation (e.g., cutting). The DSP module 50 monitors the current flow output by the second rectifying circuit 65 using the current sensor 210. This combination is extremely advantageous when working with a workpiece 20 that has voids (e.g., metal mesh). As the voltage drops when the plasma torch is moved over a void in the workpiece 20, the DSP module 50 closes the pilot arc control switch 200, maintaining a pilot arc between the electrode 15 and the nozzle 16. The switch 200 is kept closed until a current flow is detected through the workpiece 20, via the current sensor 205. This indicates that the electrode 15 is past the void, so the DSP module 50 commands the switch 200 open and all of the current flows once again through the workpiece 20. This technique is part of the control software in the DSP module 50 and is well documented in U.S. Pat. No. 5,620,617, which is incorporated herein by reference.

Figure 7:
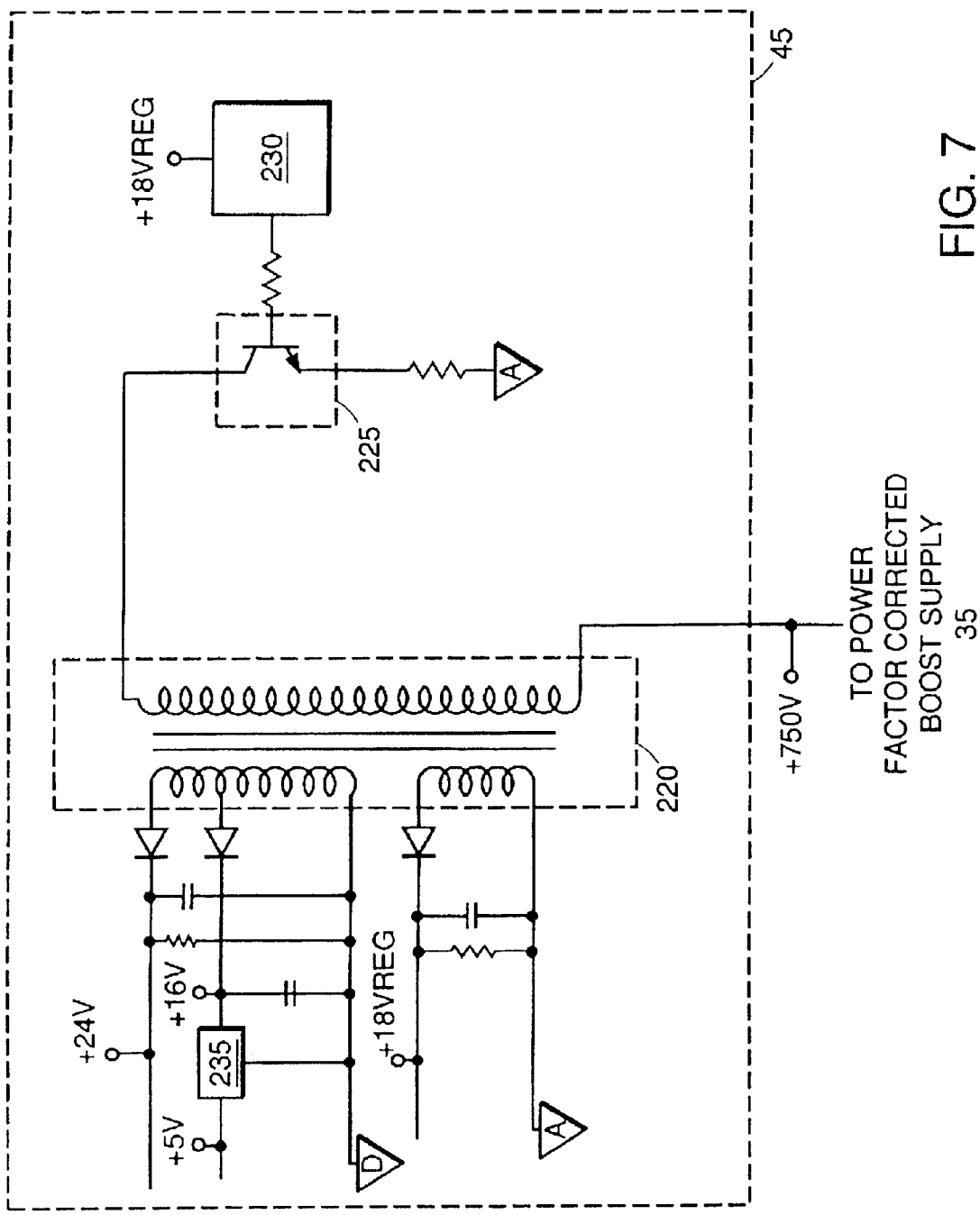
FIG. 7 is a circuit diagram of an embodiment of an auxiliary power supply of a plasma arc power supply and control system according to the invention.

FIG. 7 provides detail of the auxiliary power supply 45. In the embodiment of FIG. 7, the auxiliary power supply 45 uses a flyback topology. The use of a flyback topology is well known to those skilled in the art and will be described generally. The auxiliary power supply 45 includes a flyback transformer 220, a switch 225 and a feedback circuit 230. The feedback circuit 230 opens and closes the switch 225. Switching the DC signal output (i.e., the voltage on the +750V bus) of the power factor corrected boost stage 35 through the transformer 220 creates the regulated output voltages needed for all of the control circuitry of the plasma arc power supply and control system 10. One advantage of this embodiment is that the auxiliary power supply 45 provides a minimum load to the power factor corrected boost stage 35. By providing a minimum load, the control of the power factor corrected boost stage 35 is more stable and accurate.

In one embodiment, the voltages created by the auxiliary power supply 45 are 24 volts, 18 volts, 16 volts and 5 volts. In this embodiment, the 24 volts is used to drive the relay coil of the relay 125 in the inrush current limiting circuit 30. In another embodiment, the 24 volts can also powers a fan, the current sensors and a gas solenoid. The 5 volts powers the DSP device 280 (shown in FIG. 8) of the DSP module 50, as well as all other logic devices that require 5 volts. The 5 volt signal from the auxiliary power supply 45 is also referred to as a regulated power signal. Until the DSP device 280 receives this signal (i.e., 5 volts, +/–10%), the DSP device 280 does not operate and the control signals are held in a "safe" state via the output conditioning circuit 285 (shown in FIG. 8). In another embodiment, the 5 volts can also power temperature and pressure sensors. The 18 volts powers the switch controller 170 of the power factor corrected boost stage 35. In another embodiment, the 18 volts also powers the lower inverter switch 180". In other embodiments, other secondary windings can be added as different regulated voltage levels are needed by the plasma arc power supply and control system 10. Other windings can also be added for isolated voltages of the same magnitude. For example, there can be another 18 volt winding that is used to drive the upper inverter switch 180'. This would isolate the power source of the two switches 180', 180" for safety reasons.

The feedback circuit monitors the 18 volt output and adjusts the switching of the switch 225 to maintain 18 volts with some specified tolerance. As shown in FIG. 7, the 5 volts regulated power signal is created by using a three terminal voltage regulator 235 (e.g., P/N TL780-05CKC, manufactured by Texas Instruments) attached to the 16 volt bus. In other embodiments, the 5 volt bus can be a separate dedicated secondary winding or the control of the switch 225 can be based on other voltage busses. Not shown are other inputs into the feedback circuit 230 that monitor for over-current or over-voltage or any other unsafe operating conditions and cause the feedback circuit 230 to react accordingly. Such circuitry is well known in the art.

Figure 8:
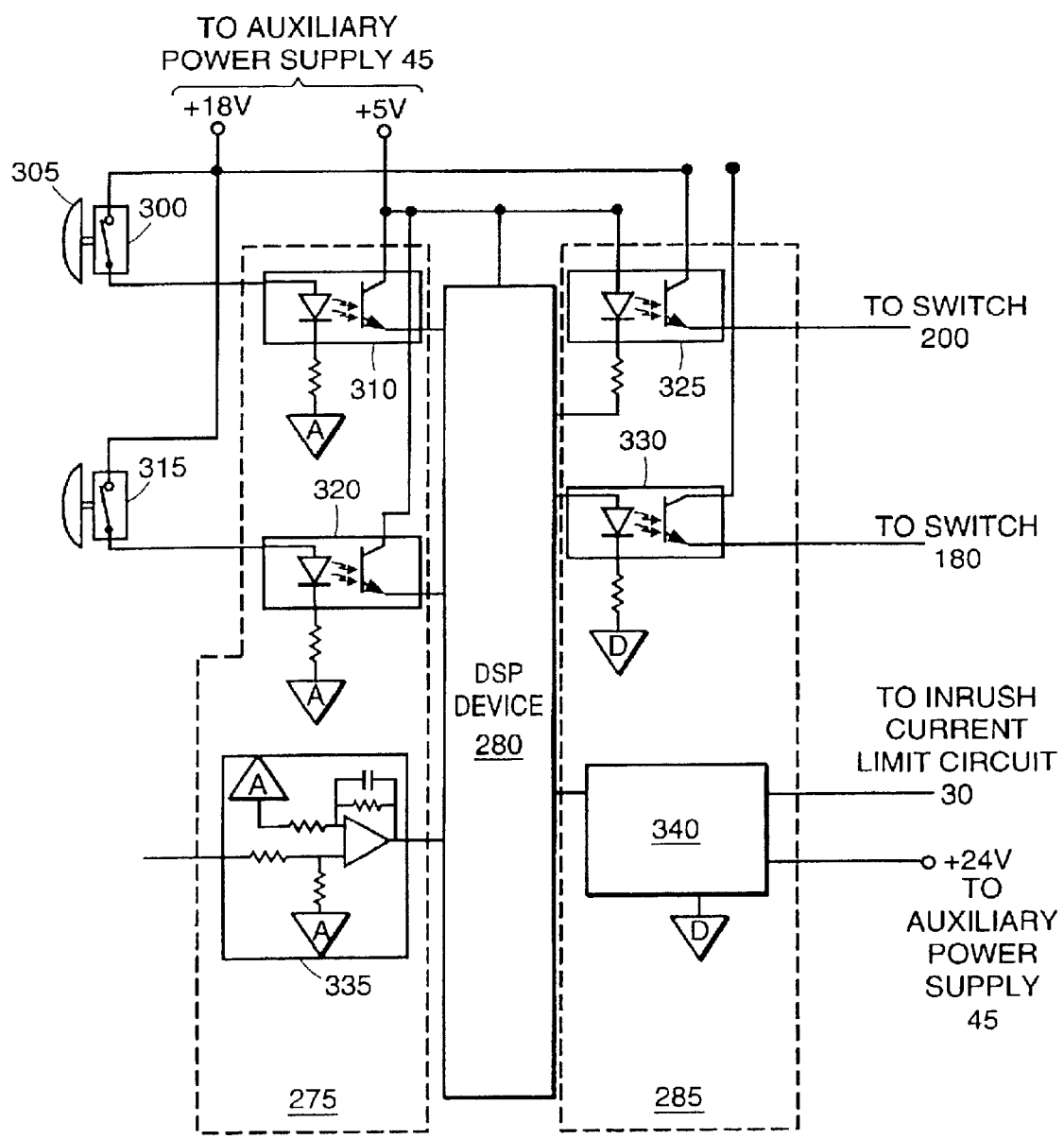
FIG. 8 is a block diagram of an embodiment of a digital signal processor module of a plasma arc power supply and control system according to the invention.

FIG. 8 schematically shows major components of the DSP module 50. The DSP module 50 includes an input conditioning circuit 275, a DSP device 280 (e.g., P/N TMS320F241, manufactured by Texas Instruments) and an output conditioning circuit 285. The input conditioning circuit 275 receives signals generated throughout the plasma arc power supply and control system 10 and conditions these received input signals to make them compatible with the DSP device 280. The output conditioning circuit 285 receives signals generated by the DSP device 280 and conditions these received output signals to make them compatible with their destination devices throughout the plasma arc power supply and control system 10.

One function of the conditioning circuits 275, 285 is scaling of the inputs or outputs. The input conditioning circuit 275 can include a circuit for scaling 18 volts to 5 volts. The safety status signal can be an 18 volt signal. The 18 volts is generated by the auxiliary power supply 45 and sent to the plasma torch retaining cap switch 300. There is a retaining cap 305 on the plasma torch that the user removes to replace the consumables such as the electrode 15. As long as that retaining cap 305 is on the plasma torch, the retaining cap 305 closes the retaining cap switch 300 and the state of the safety status signal is "safe." The safe state is an 18 volt signal. In one embodiment, the DSP device 280 is configured to receive a maximum of 5 volts for an input signal to its digital logic section. The input conditioning circuit 275 includes an optically coupled switch 310 (e.g., P/N PC817, manufactured by Liteon). When the retaining cap switch 300 is in the closed position, current flows through a light emitting diode ("LED") internal to the optically coupled switch 310. The current flow causes the LED to emit light. The light causes the switch 310 to close (i.e., the light induces a BJT to conduct) and this switches 5 volts to the DSP device 280. When the retaining cap 305 is removed, the switch 300 is open, which causes the optically coupled switch 310 to be open and the state of the safety status signal is "unsafe" (i.e., the DSP device does not receive the 5 volt signal).

The start signal can also be an 18 volt input signal. The start switch 315 is spring loaded to be normally open, so when the start switch 315 is open, the start signal is a no voltage signal. When the user closes the switch 315, the start signal becomes an 18 volt signal. The input conditioning circuit 275 includes a second optically coupled switch 320 (e.g., P/N PC817, manufactured by Liteon) to scale the signal from 18 volts to 5 volts, the same way as described for the safety status signal.

There are also 18 volt output signals that must be scaled. The output conditioning circuit 285 includes circuitry for scaling 5 volts to 18 volts. For example, the switch 200 of the pilot arc control switch 70, shown in FIG. 6, is controlled with an 18 volt pilot arc control signal. In one embodiment, the DSP device 280 generates a 5 volt output signal (i.e., 0 volts off, 5 volts on), thus the output conditioning circuit 285 scales this output from 5 volts to 18 volts using another optically coupled switch 325 (e.g., P/N HCPL-J312, manufactured by Hewlett Packard). The high side of the internal LED of this optically coupled switch 325 is tied to 5 volts and the DSP device 280 commands the low side. The DSP device 280 commands the LED by supplying a 5 volt signal, which results in no current flow through the internal LED and thus an open switch. Alternatively, the DSP device 280 supplies a ground signal, which results in current flow through the internal LED, light emission and thus a closed switch (i.e., without light, the internal BJT does not conduct). Closing this switch 325 sends an 18 volt pilot arc signal to the switch 200 in the pilot arc control switch 70. This 18 volt pilot arc signal causes the switch 200 to close and current to flow from the electrode 15 to the nozzle 16.

The output control signal can also be a 5 volt signal that is converted to 18 volts. In one embodiment, the output control signal includes two signals, a positive switch command and a negative switch command. The positive switch command controls the opening and closing of switch 180', shown in FIG. 5, of the inverter stage 40. The negative switch command controls the opening and closing of switch 180", shown in FIG. 5, of the inverter stage 40. The positive switch command and the negative switch command can both be 5 volt output signals of the DSP device 280. The output conditioning circuit 285 includes circuitry to convert these 5 volt signals to 18 volt signals to drive the switches 180', 180". The 5 volt signal is converted to an 18 volt signal the same way the pilot arc control signal is converted, as described above, with one difference. The difference from the pilot arc control signal is that the DSP device 280 commands are tied to the high side of the internal LED of the optically coupled switch 330 and the low side of the internal LED is tied to ground.

In one embodiment, the DSP device 280 generates a second control signal as an output to command the switch 160 of the power factor corrected boost stage 35. The 5 volt second output signal is converted to an 18 volt signal in the same manner as the positive switch command is converted, as described above.

The input conditioning circuit 275 also includes a scaling circuit 335 to scale the rectified voltage signal (labeled $V_{ACR}$ in FIGS. 4a and 4b). The voltage of the rectified voltage signal prior to scaling can be up to 930 volts peak, which is too high for the analog to digital converter ("A/D") of the DSP device 280 to handle. This signal is scaled using the scaling circuit 335 (e.g., designed using a differential amplifier), which can be designed by one skilled in the art to obtain the desired gain needed for the particular signal. The scaling circuit 335 generates a scaled signal as an output and provides this scaled signal to the DSP device 280. In one example, the output of the scaling circuit 335 can be about 5 millivolts per volt of the input voltage to the scaling circuit 335, or a gain of 0.005. In another embodiment, the rectified voltage signal can be input to the scaling circuit 335 using an analog isolation amplifier, for example P/N HCPL-7840, manufactured by Hewlett Packard. This device electrically isolates the input from the output.

The input conditioning circuit 275 can also include circuitry to scale the transfer signal. The transfer signal prior to scaling is the output of the current sensor 205, shown in FIG. 6. The voltage level of the transfer signal output from the current sensor 205 is about 50 millivolts per ampere of current flowing through the current sensor 205. Since this signal is used to detect the start of current flow through the workpiece 20, the voltage is amplified to about 1 volt per ampere of current flowing through the current sensor 205. This amplification ensures that a small current flow will result in a large and noticeable voltage change. The transfer signal is scaled using a scaling circuit 335. The scaling circuit 335 generates a scaled signal as an output and provides this scaled signal to the DSP device 280. In one example, the output of the scaling circuit 335 can be about 20 volts per volt of the input voltage to the scaling circuit 335, or a gain of 20.

In addition to scaling voltage, the conditioning circuits 275, 285 also scale current. The DSP device 280 can generate 5 volts to supply or sink current or generate a digital ground to sink current, but only at specified current levels. For example, the relay 125 of the inrush current limiting circuit 30, shown in FIG. 3, is controlled by tying the high side to the 24 volt power bus and supplying a ground on the low side to conduct current. The DSP device 280 commands the low side. This command can be referred to as the relay control signal. In one embodiment, the DSP device 280 can supply a ground voltage, but the DSP device 280 cannot sink the current to directly control the relay 125. Thus, the output conditioning circuit 285 includes a buffer device 340 (e.g., P/N ULN2003, manufactured by Motorola) which is able to sink the current from the relay 125 when the DSP device 280 commands the buffer by outputting the relay control signal.

The current command signal is filtered by the input conditioning circuit 275. In one embodiment, the current command signal is an analog signal that varies from zero to 5 volts. The user enters the desired current by rotating a potentiometer. The voltage of the wiper of the potentiometer is transmitted to the A/D of the DSP device 280. A 0.10 microfarad capacitor tied to ground is used to decouple this voltage signal. In other embodiments, a R-C anti-aliasing filter can be used. The anti-aliasing filter is the typical filter for most of the inputs to the A/D of the DSP device 280. This filter limits the current flow into the DSP device 280 and filters out high frequency noise that may be coupled on the signal.

The input conditioning circuit 275 and output conditioning circuit 285 include pull-up resistors (high resistance tied to 5 volts) and pull-down resistors (high resistance tied to ground). These resistors are commonly used to ensure that prior to the DSP device 280 becoming fully operational, outputs and inputs will be tied to an appropriate "safe" state.

The conditioning circuits 275, 285 also include circuitry to program the DSP device 280 while the DSP device 280 is installed on the circuit board (i.e., on-board programming). In one embodiment, this is implemented using a serial communication channel that is RS232 compliant. An external storage device is connected to the RS232 port. Command signals are communicated through the RS232 communication channel and the computer program (i.e., software) in the external memory device is transferred to the DSP device 280. In another embodiment, Join Test Action Group ("JTAG") pins are used. This is an IEEE standard that uses four pins labeled TCK, TDI, TDO and TMS. The external storage device communicates to the DSP device 280 and downloads the software using the four JTAG pins and the defined JTAG protocol.

The DSP device 280 does not become fully operational until the 5 volt power, (i.e., the regulated power signal) reaches a minimum voltage level. For example, when the regulated power signal reaches 4.7 volts. This ensures that the DSP device 280 will start and function correctly, making correct decisions and driving output signals to the correct "high" state (i.e., 5 volts). With a proper regulated power signal, the DSP device can provide the output control signal to the inverter stage 40.

In one embodiment, the output control signal can be two signals, the positive 5 switch command and the negative switch command, as described above. The DSP device 280 calculates a PWM value for the output control signal and uses this value to generate both the positive switch command signal and the negative switch command signal. This matched set method ensures that equal volt-seconds are applied to the transformer 195 to avoid saturation. Commanding a matched set is one advantage of using the DSP device 280.

To determine the output control signal, the DSP device 280 can use several input and output signals. One control method is to monitor the duty cycle of the inverter stage 35 by monitoring the PWM values of the output control signal over time. The maximum duty cycle would be set in software to prevent saturation of the transformer 195 and limit the arc stretch voltage available to the electrode 15. In another embodiment, the DSP device 280 would change this maximum duty cycle based on the voltage magnitude of the external power source. The DSP device would determine the voltage magnitude of the external power source using the rectified voltage signal. For example, for a half bridge inverter, if the magnitude was less than 550 volts rms, the max duty cycle for each switch would be limited to 46 percent duty. If the magnitude was 551–600 volts rms, the max duty cycle would be limited to 44 percent. If the magnitude was 601–650 volts rms, the max duty cycle would be limited to 42 percent. If the magnitude was greater than 650 volts rms, the max duty cycle would be limited to 40 percent.

The DSP device 280 can also use the start signal to determine the output control signal. If the start signal is not in the "start" state, then the DSP device 280 can inhibit the output control signal, thus inhibiting any current to the electrode 15. This ensures that there will be no accidental current flow until the user indicates, via the start switch, that he or she is ready to use the electrode 15. In another embodiment, this logic can also be implemented in the conditioning circuits 275, 285. For example, the start signal could directly enable and disable the switches 180', 180" of the inverter stage 40 if the start signal is in the "start" state and "not start" state, respectively.

The DSP device 280 can also use the safety status signal to determine the output control signal. If the safety status signal is not in the "safe" state (i.e., the retaining cap is removed), then the DSP device 280 inhibits the output control signal, thus inhibiting any current to the electrode 15. This ensures that there will be no accidental current flow until the user replaces the cap, indicated via the retaining cap switch. In another embodiment, the current inhibit logic can also be implemented in the conditioning circuits 275, 285. For example, the safety status signal could directly enable and disable the switches 180', 180" of the inverter stage 40 if the safety status signal is in the "safe" state and "unsafe" state, respectively.

In another embodiment, for additional safety, the DSP device 280 can latch the safety status signal when the safety status signal changes from the "safe" state to the "unsafe" state. This change would occur when the user removed the retaining cap while the DSP device 280 was receiving the regulated power signal. By latching the change to the "unsafe" state, the user would be forced to take action before current flows to the electrode 15. One action can be that the user must completely power down the plasma arc power supply and control system 10. Upon power-up, the plasma arc power supply and control system 10 perform a power-up built in test to ensure safe operation of the plasma torch.

The DSP device 280 can also use the current command signal and the current feedback signal to determine the output control signal. The DSP device 280 reads the current command signal, which as described above is read by the A/D converter of the DSP device 280, and converts the signal to counts. The DSP device 280 converts the counts to a desired value of current. The DSP device 280 reads the current feedback signal, which as described above is read by the A/D converter of the DSP device 280, and converts the signal to counts. The DSP device 280 converts the counts to a value of current that is being supplied to the electrode 15. If the current feedback signal does not match the value current command signal, the DSP device 280 adjusts the output control signal accordingly to make the value of the current supplied to the electrode 15 equal to the desired value of current.

In another embodiment, the DSP device 280 uses the rectified voltage signal to reduce (i.e., foldback) the current supplied to the electrode 15, notwithstanding the current command signal. The DSP device 280 monitors and averages the rectified voltage signal. Then, by comparing instantaneous values of the rectified voltage signal to the running average, the DSP device 280 determines if the input power from the external power source is single phase. If the input power is single phase, the DSP device 280 limits the voltage to the electrode 15, by limiting the duty cycle of the output control signal. For example, if the input voltage is less than 225 volts rms, the DSP device 280 limits the duty cycle to:

D=0.277 (Vac/Iout) or 0.82, whichever is lower, where Vac is the input power voltage magnitude and Iout is the output current to the electrode 15. Other algorithms can be used as required by design. For example, the control can be based on limiting the output current.

In another embodiment, the DSP device 280 uses the transfer signal and pilot arc control signal to reduce (i.e., foldback) the current supplied to the electrode 15, notwithstanding the current command signal. As described above, the DSP module 280 controls the current flow through the nozzle 16 or the workpiece 20 via the pilot arc control switch 70. The DSP device 280 also controls the amount of current to the electrode via the output control signal, depending on whether the current is flowing through the nozzle 16 or the workpiece 20. If the current is flowing through the workpiece 20, the current is supplied as requested by the user. However, when the current flows through the nozzle, the current level is reduced. For example, to maintain a pilot arc, 16 amperes of current can be needed. This coordination reduces heat dissipation and saves the wear of the consumables.

In addition to the output control signal, the DSP device 280 also produces the relay control signal to control relay 125 shown in FIG. 3. The relay control signal is generally active only at start-up, (i.e., during the precharging of the bulk capacitance). The DSP device 280 can use the regulated power signal to determine the relay control signal. The DSP device 280 will power-up with the relay control signal in the "open" state. As described above, the relay 125 in the "open" state directs current flow through the inrush current limiting resistors 130, 135. When the regulated power signal has reached a minimum value and has maintained that minimum value for a period of time, the DSP device 280 will change the relay control signal to the "close" state as a function of the input capacitance. In another embodiment, the DSP device 280 can use the rectified voltage signal to determine the relay control signal. When the rectified voltage signal reaches a certain minimum voltage, indicating that the input capacitance has been precharged, the DSP device 280 will change the relay control signal to the "close" state.

In one embodiment, the DSP device 280 also produces a second output control signal to control the power factor corrected boost stage 35. The DSP device 280 can use the output control signal to determine the second output control signal. The DSP device 280 synchronizes the power factor corrected boost stage 35 and the inverter stage 40. The synchronization can be running both stages 35, 40 at the same switching frequency. The synchronization can be running the power factor corrected boost stage 35 at a multiple of the switching frequency of the inverter stage 40. The advantages of this synchronization are to reduce EMI, system noise and ripple current in capacitors. By keeping the two stages synchronized, the total frequency components of the current and voltage are kept to a minimum.

In another embodiment, the DSP device 280 uses a harmonic injection algorithm to modify the power factor. The DSP device 280 monitors the harmonic content of the current and the voltage. The DSP device 280 uses the rectified voltage signal and the current of the inductor 155 measured by current sensor 175. The DSP device 280 analyzes the harmonic content of each and adjusts the output control signal and the second output control signal to make the current and voltage frequency components as similar as possible.

In addition to determining outputs, the DSP device 280 is also configured to perform self-health monitoring. For example, a watchdog timer is used to ensure that the software of the DSP device 280 is executing properly. Generally, a watchdog timer is a timer that counts down a specified time interval, usually as long as the main software loop (e.g., 6 milliseconds). Before the time-out period, the software must service the watchdog timer (e.g., reset it). If the watchdog timer is not serviced by the software prior to time-out, it will send a watchdog timer interrupt, causing the software to reset itself. Upon reset, for example, the DSP device 280 starts executing at the initial software instruction location used at power-up. In another embodiment, there is an additional watchdog timer in the conditioning circuits 275, 285. The DSP device 280 is required to service this external watchdog timer also. If the DSP device 280 does not service the external watchdog timer, the external watchdog timer resets the DSP device 280. For example, the external watchdog circuit toggles the reset input pin of the DSP device 280 from high to low, causing the DSP to reset all outputs and software execution. This ensures that if for some reason the DSP device 280 software gets "lost" during execution, the DSP device 280 is reset.

The DSP device 280 is well suited for controlling the power supply 5, 5' of a plasma arc power supply and control system 10. It can easily be configured to command a matched set output control signal. It can coordinate all of the different modules of the power supply 5, 5'. For example the power factor corrected boost stage 35 switching frequency can be synchronized with the inverter stage 40 switching frequency, and the pilot arc control signal can be coordinated with the output control signal for smooth current flow. The DSP device 280 monitors its health, monitors the safety of operation and can be reprogrammed in the field as needed.

Equivalents

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein. The power supply and control system can also be used in other arts such as welding.

What is claimed is:

1. A method of controlling a power supply of a plasma arc system, the power supply including an input stage, a power factor corrected boost stage and an inverter stage, the method comprising:

(a) providing into the input stage any AC input voltage within a range of input voltages and thereby generating a rectified output voltage;

(b) providing into the power factor corrected boost stage the rectified output voltage and thereby generating a DC signal;

(c) providing into an auxiliary power supply the DC signal and thereby generating a regulated power signal;

(d) providing into a digital signal processor module the regulated power signal and thereby generating an output control signal; and (e) providing into the inverter stage the output control signal and thereby generating a plasma arc current.

2. The method of claim 1 wherein step (d) comprises generating the output control signal based on an average duty cycle of the inverter stage.

3. The method of claim 1 further comprising (f) providing into the digital signal processor module at least one of (i) a start signal generated in response to a user input and (ii) a current command signal generated in response to a user input and (iii) a current feedback signal generated in response to current flow through a plasma torch electrode.

4. The method of claim 3 wherein step (e) comprises providing the output control signal to the inverter stage based on the regulated power signal and at least one of (i) the start signal, (ii) the current command signal and (iii) the current feedback signal.

5. The method of claim 1 further comprising (f) providing into the digital signal processor module a rectified voltage signal generated in response to the rectified output voltage of the input stage.

6. The method of claim 5 further comprising (g) limiting one of (i) a plasma arc voltage and (ii) the plasma arc current based on the rectified voltage signal.

7. The method of claim 1 further comprising:

(f) providing into the digital signal processor module a transfer signal generated in response to current flow through a work piece; and (g) providing from the digital signal processor module to a nozzle in a plasma torch electrode a pilot arc control signal.

8. The method of claim 7 wherein step (e) comprises providing the output control signal to the inverter stage based on the transfer signal.

9. The method of claim 7 further comprising (h) inhibiting current flow through the nozzle in the plasma torch electrode in response to the pilot arc control signal.

10. The method of claim 1 further comprising providing a relay control signal from the digital signal processor module to a relay that opens or closes a substantially short circuit in parallel with an inrush current limiting resistor provided in the power supply.

11. The method of claim 10 wherein the step of providing the relay control signal is based on at least one of (i) the regulated power signal and (ii) the rectified output voltage.

12. The method of claim 1 further comprising (f) providing to the power factor corrected boost stage from the digital signal processor module a second output control signal.

13. The method of claim 12 wherein the second output control signal is based on the frequency of the switching of the inverter stage.

14. The method of claim 1 further comprising providing into the digital signal processor module a safety status signal generated in response to the removal of a retaining cap of a plasma torch electrode.

15. The method of claim 14 further comprising (g) latching the state of the safety status signal when the safety status signal changes from a first value to a second value.

16. The method of claim 14 further comprising inhibiting the flow of the plasma arc current in response to the safety status signal.

17. The method of claim 1 further comprising (f) using a harmonic injection algorithm to modify a power factor of the power supply.

18. The method of claim 1 wherein step (c) comprises:
(c1) providing the DC signal to a transformer provided inside the auxiliary power supply;
(c2) providing from the transformer the regulated power control signal; and
(c3) switching the DC signal through the transformer in response to a value of the regulated power signal.

19. The method of claim 1 further comprising (f) generating a rectified voltage from the output of the inverter stage of the power supply, the output of the inverter stage capable of producing the plasma arc current.

20. The method of claim 1 further comprising (f) damping the generated rectified output voltage of the input stage.

21. The method of claim 1 further comprising (f) filtering the AC input voltage prior to the step of providing the AC input voltage to the input stage.

22. A system for controlling a power supply of a plasma arc system, the system comprising:
an input stage including a circuit for receiving any AC input voltage within a range of input voltages and generating a rectified output voltage;
a power factor corrected boost stage electrically connected to the input stage, the power factor corrected boost stage including a circuit for receiving the rectified output voltage and generating a DC signal;
an inverter stage electrically connected to the power factor corrected boost stage, the inverter stage including a circuit for receiving the DC signal and generating an AC signal capable of providing a current to a plasma torch electrode;
an auxiliary power supply electrically connected to the power factor corrected boost stage, the auxiliary power supply including a circuit for receiving the DC signal and generating a regulated power signal;
a digital signal processor module in communication with the auxiliary power supply and the inverter stage, the digital signal processor module including a circuit for receiving the regulated power signal and providing an output control signal to the inverter stage for generating a plasma arc current.

23. The system of claim 22 wherein the digital signal processor module is in electrical communication with at least one of a first switch, a second switch, a current sensor, and an input of the power factor corrected boost stage, the first switch providing a start signal in response to a user input, the second switch providing a current command signal in response to a user input, the current sensor providing a current feedback signal in response to current flow through the plasma torch electrode, and the input of the power factor corrected boost stage providing a rectified voltage signal in response to the rectified output voltage of the input stage, and wherein the digital signal processor module is configured to provide the output control signal based on the regulated power signal and at least one of the start signal and the current command signal and the current feedback signal and the rectified voltage signal.

24. The system of claim 22 further comprising:
a pilot arc control switch in electrical communication with the digital signal processor module and a nozzle of the plasma torch electrode, the pilot arc control switch including a circuit for inducing and inhibiting current flow through the nozzle in response to a pilot arc control signal generated by the digital signal processor module.

25. The system of claim 22 further comprising:
a relay in electrical communication with the digital signal processor module, the output of the input stage and the input of the power factor corrected boost stage, the relay opening or closing a substantially short circuit in parallel with an inrush current limiting resistor provided in the power supply in response to a relay control signal generated by the digital signal processor module.

26. The system of claim 22 wherein the digital signal processor module is in electrical communication with the power factor corrected boost stage and is configured to provide a second output control signal to the power factor corrected boost stage.

27. The system of claim 22 wherein the digital signal processor module is in electrical communication with a third switch, the third switch providing a safety status signal in response to the removal of a retaining cap of a plasma torch electrode.

28. The auxiliary power supply of claim 22 wherein the circuit of the auxiliary power supply includes a flyback topology.

29. The system of claim 22 further comprising:
a second rectifier stage electrically connected to the inverter stage and a plasma torch electrode, the second rectifier stage including a circuit for generating a rectified voltage from the output of the inverter stage.

30. The system of claim 22 further comprising:
a damping stage electrically connected to the input stage and the power factor corrected boost stage, the damping stage including a circuit for damping the rectified output voltage of the input stage.

31. The system of claim 22 further comprising:
a filtering stage electrically connected to the input stage, the filtering stage including a circuit for filtering the AC input voltage prior to the input stage receiving the AC input voltage.

32. The system of claim 22 further comprising:
an on-board programming module in electrical communication with the digital signal processor module and an external storage device, the on-board programming module including a circuit for transferring a computer program contained in the storage device to the digital signal processor module.

33. The system of claim 22 wherein the digital signal processor module further comprises:
   an input conditioning circuit configured to receive an input signal from an source external to the digital signal processor module and condition the input signal to a level acceptable to a digital signal processor;
   an output conditioning circuit configured to receive an output signal from the digital signal processor and condition the output signal to a level acceptable to a circuit external to the digital signal processor module receiving the conditioned output signal; and
   a digital signal processor device communication with the first conditioning circuit and the second conditioning circuit, the digital signal processor device configured to receive the input signal and generate the output signal.

34. The system of claim 22 wherein the digital signal processor device is configured to generate the positive switch command signal and the negative switch command signal as a matched set with the same value at the same time frame of the signal generation.

* * * * *